United States Patent
Myrex (10) Patent No.: US 8,061,572 B2
(45) Date of Patent: Nov. 22, 2011

(54) PORTABLE HITCH MOUNTED CARGO CARRIER

(76) Inventor: Lee Myrex, Bremen, AL (US)

( * ) Notice: Subject to any disclaimer, the term of this patent is extended or adjusted under 35 U.S.C. 154(b) by 492 days.

(21) Appl. No.: 12/391,472

(22) Filed: Feb. 24, 2009

(65) Prior Publication Data

US 2009/0152314 A1 Jun. 18, 2009

(51) Int. Cl.
*B60R 9/06* (2006.01)
(52) U.S. Cl. ............................ 224/502; 224/519; 224/98
(58) Field of Classification Search .................. 224/519, 224/502, 98, 520, 521
See application file for complete search history.

(56) References Cited

U.S. PATENT DOCUMENTS

| 3,543,890 A | | 12/1970 | Criswell | |
|---|---|---|---|---|
| 3,796,333 A | * | 3/1974 | Goldstein | 414/462 |
| 4,372,568 A | * | 2/1983 | Campbell | 280/63 |
| 4,593,840 A | | 6/1986 | Chown | |
| 4,644,876 A | * | 2/1987 | Thomas | 108/192 |
| 4,744,590 A | | 5/1988 | Chesney | |
| 4,844,528 A | | 7/1989 | Johnson | |
| 5,018,651 A | * | 5/1991 | Hull et al. | 224/502 |
| 5,067,692 A | | 11/1991 | Nudd et al. | |
| 5,460,304 A | | 10/1995 | Porter et al. | |
| 5,536,130 A | * | 7/1996 | Edensor | 414/462 |
| 5,544,799 A | * | 8/1996 | Didlake | 224/502 |
| 5,586,702 A | * | 12/1996 | Sadler | 224/521 |
| 5,642,844 A | * | 7/1997 | Rector | 224/401 |
| 5,676,292 A | * | 10/1997 | Miller | 224/524 |
| 5,788,135 A | * | 8/1998 | Janek | 224/527 |
| 5,881,937 A | | 3/1999 | Sadler | |
| 6,024,263 A | * | 2/2000 | Lewis et al. | 224/509 |
| 6,129,371 A | * | 10/2000 | Powell | 280/461.1 |
| 6,139,247 A | * | 10/2000 | Wright | 414/462 |
| 6,186,729 B1 | * | 2/2001 | Sargent | 414/462 |
| 6,302,381 B1 | | 10/2001 | Roll | |
| 6,802,441 B1 | | 10/2004 | DuRant et al. | |
| 2002/0005423 A1 | * | 1/2002 | Grover | 224/509 |
| 2002/0063142 A1 | * | 5/2002 | Williams et al. | 224/519 |
| 2003/0173387 A1 | * | 9/2003 | Mitchell | 224/499 |
| 2004/0123529 A1 | * | 7/2004 | Wiese et al. | 52/6 |

* cited by examiner

*Primary Examiner* — Brian D Nash
(74) *Attorney, Agent, or Firm* — Gerald M. Walsh; Kenneth M. Bush; Bush Intellectual Property Law (57) ABSTRACT

A cargo carrier having a U-shaped hitch sleeve on its bottom and legs with wheels on its sides. A hitch shaft is inserted into a trailer hitch on a vehicle and the U-shaped hitch sleeve fits over the hitch shaft. The legs have an internal screw type jack mechanism to raise and lower the cargo carrier to place the U-shaped hitch sleeve above and over the hitch shaft, and to raise the legs so that the vehicle can transport the cargo carrier on the hitch shaft without having to remove the legs. The wheels allow the cargo carrier to be portable when not connected to the vehicle. They also allow the U-shaped hitch sleeve to be aligned above the hitch shaft to permit lowering the U-shaped hitch sleeve down over the hitch shaft for the insertion of bolts through the U-shaped hitch sleeve and hitch shaft, thereby fastening the cargo carrier to the hitch shaft. The legs are positioned inside the cargo carrier, and a continuous loop chain engages all the legs so that adjustment of one leg adjusts all of the legs simultaneously to raise or lower the cargo carrier.

4 Claims, 8 Drawing Sheets

PORTABLE HITCH MOUNTED CARGO CARRIER

CROSS-REFERENCE TO RELATED APPLICATION

This application claims the benefit of U.S. Nonprovisional patent application Ser. No. 11/250,898 filed Aug. 14, 2005, now abandoned, the disclosure of which is incorporated herein in its entirety as if fully set forth below.

BACKGROUND OF THE INVENTION

1. Field of the Invention

The present invention relates to cargo carriers which can be reversibly hitched to the rear of a vehicle, and, more particularly to a cargo carrier with rotatably mounted legs with wheels that have an internal screw type jack to raise and lower the cargo carrier.

2. Technical Background

Cargo carriers are known which have a hitch sleeve on the bottom of the carrier and a trailer hitch shaft which can be inserted into a receiver style trailer hitch on a vehicle. The trailer hitch shaft can also be inserted into the hitch sleeve on the bottom of the carrier. These carriers have no convenient means for lifting or moving the carrier. Other cargo carriers are known which also have legs with wheels where the legs can be raised and lowered by hand. Although these types of cargo carriers can be transported on their wheels, they are difficult to raise and lower by hand if they are heavy. Still other cargo carriers are known which also have rotatable legs with wheels which can be rotated up off the ground when the cargo carrier is attached to a vehicle, but the legs are not height-adjustable. In order to overcome some of these limitations, cargo carriers have been constructed with jacks that have wheels so that a cargo carrier with a heavy load can be easily raised and lowered and also be moved from one location to another on its own wheels. However, the jacks with wheels have to be removed from the cargo carrier after it has been hitched to a vehicle. In addition, the jack mechanism in these jacks is exposed to the external environment which can promote fouling and/or corrosion of the jack mechanism.

SUMMARY OF THE INVENTION

The portable cargo carrier of the present invention has a U-shaped hitch sleeve centered on the cargo carrier bottom so that it is alignable to be positioned above and fit over a hitch shaft that has been inserted into a receiver style trailer hitch on a vehicle. The cargo carrier also has four legs with casters and wheels, thereby making the carrier portable. The legs have a telescopic construction so that they can be lengthened or shortened by a screw type jack mechanism. The jack mechanism is contained within the legs, thereby protecting the jack mechanism. The jack provides a means for secure, easy, and precise raising and lowering of the cargo carrier, even with loads up to 800 pounds. The legs are rotatably attached to the outside of the carrier so that they can be rotated off the ground when the carrier is hitched to a vehicle, allowing the legs to remain on the carrier while the carrier is being transported by a vehicle. Alternatively, the legs can be positioned within the interior of the carrier.

An advantage of the present invention is a cargo carrier that can be easily raised or lowered by screw type jacks to hitch the carrier to a vehicle.

Another advantage is a cargo carrier that has wheels which allow the carrier to be easily transported from one location to another.

Another advantage is a cargo carrier that has legs with wheels and screw type jacks, where the legs are rotatable, thereby permitting the legs to remain on the carrier when the carrier is hitched to a vehicle.

Another advantage is a cargo carrier that is easy to hitch to a vehicle by means of a U-shaped hitch sleeve which fits over a hitch shaft.

Another advantage is a cargo carrier that is simple and inexpensive to manufacture.

DETAILED DESCRIPTION OF THE INVENTION

While the following description details the preferred embodiments of the present invention, it is to be understood that invention is not limited in its application to the details of construction and arrangement of the parts illustrated in the accompanying drawings, since the invention is capable of other embodiments and of being practiced in various ways.

Figure 1:
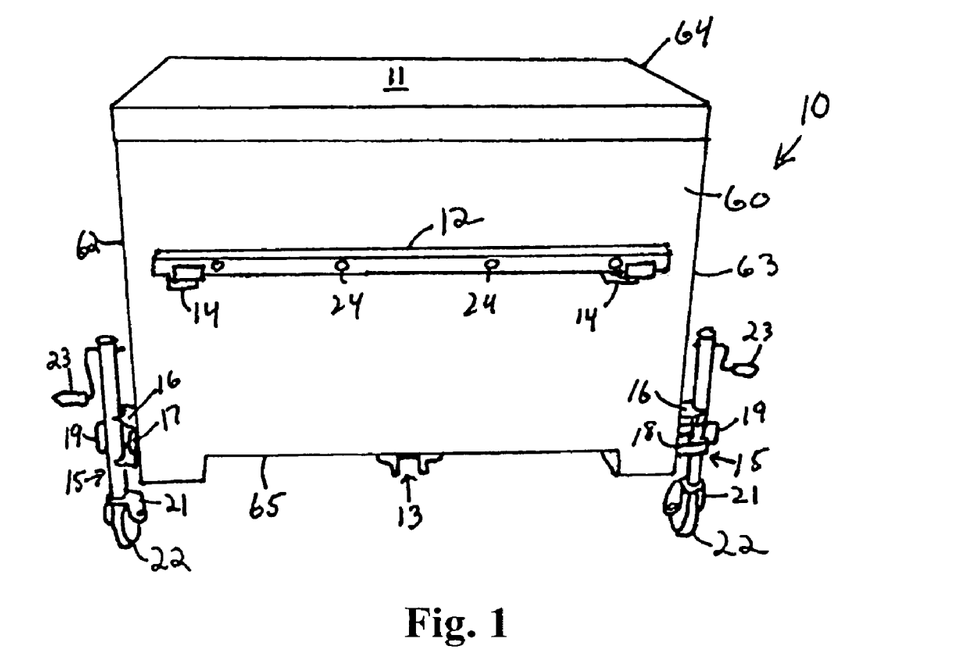
FIG. 1 shows a front view of the portable hitch mounted cargo carrier of the present invention.

The cargo carrier 10 of the present invention is shown in FIG. 1. The cargo carrier 10 has a front 60, a back 61 (see FIG. 3), a left side 62, a right side 63, a top 64, and a bottom 65. Top 64 is constructed as a lid 11. Front 60 has a pair of hitch shaft holders 14 to hold hitch shaft 12 when cargo carrier 10 is not hitched to a vehicle. Bottom 65 has a hitch sleeve 13 centered on bottom 65. Left side 62 and right side 63 each have a pair of telescoping legs 15 and sleeves 17. Each leg has a clamp frame 16 which is fixed rotatably to sleeve 17. Clamp frame 16 has locking pins 18 (see FIG. 8) which form locking pin handle 19. Legs 15 have casters 21 with wheels 22. Legs 15 also have a jack handle 23 which operates a screw type jack 44 (see FIG. 7) to raise and lower legs 15. Hitch shaft 12 has holes 24 to reversibly attach hitch shaft 12 to hitch sleeve 13 and to a trailer hitch 31 on a vehicle 30 (see FIG. 2).

Figure 2:
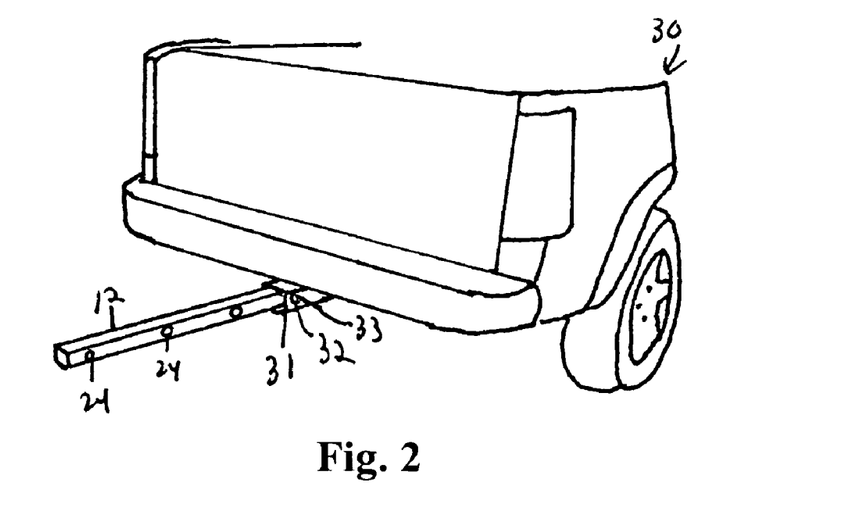
FIG. 2 shows a hitch shaft inserted into a receiver style trailer hitch on a vehicle.

FIG. 2 shows hitch shaft 12 inserted into vehicle trailer hitch 31 on vehicle 30. Vehicle trailer hitch 31 has a hole 32 which can be aligned with a hitch shaft hole 24. A locking bolt 33 can be inserted through holes 32 and 24 to hold hitch shaft 12 firmly in place in vehicle trailer hitch 31.

Figure 3:
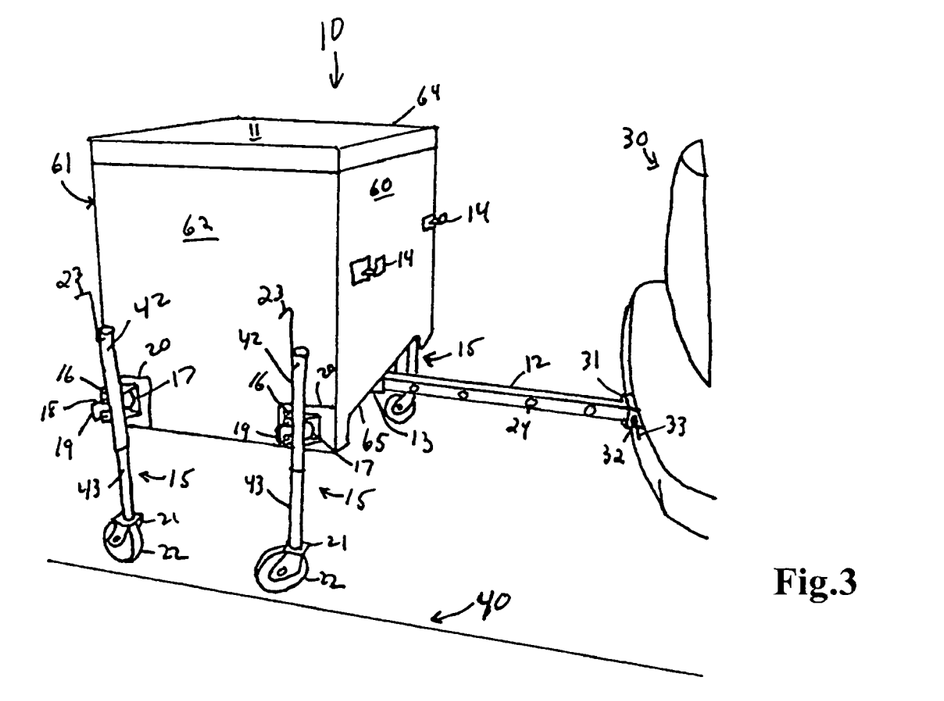
FIG. 3 shows the cargo carrier elevated by the jack mechanisms in the legs so that the hitch sleeve will fit over the hitch shaft and the carrier can be pushed towards the vehicle.

FIG. 3 illustrates the telescoping feature of legs 15. Legs 15 have a lower portion 43 which fits slideably into upper leg portion 42. Jack handle 23 can be rotated to operate a screw type jack 44 inside the upper 42 and lower 43 portions of leg 15 (see FIG. 7). Screw type jack 44 can extend lower leg portion 43 out of upper leg portion 42, thereby increasing the length of leg 15. Screw type jack 44 can withdraw lower leg portion 43 into upper leg portion 42, thereby shortening the length of leg 15. Cargo carrier 10 can be raised by increasing the length of legs 15 and lowered by decreasing the length of legs 15. FIG. 3 shows that legs 15 have been lengthened to raise cargo carrier 10 so that hitch sleeve 13 fits over hitch shaft 12. Cargo carrier 10 can be pushed forward on the ground 40 towards vehicle 30 so that hitch sleeve 13 moves over and is alignable with hitch shaft 12. The cargo carrier 10 can then be lowered down, over, and around the hitch shaft 12 so that hitch shaft holes 24 align with holes 41 in hitch sleeve 13 (see FIG. 5). Locking bolts 33 can be inserted through holes 24 and 41 to hold hitch shaft 12 firmly in place in hitch sleeve 13. In this manner cargo carrier 10 can be securely attached to vehicle 30. FIG. 3 also shows a sleeve base 20 attached to cargo carrier 10. Sleeve base 20 has a sleeve 17. Clamp frame 16 fits rotatably on sleeve 17, thereby rotatably fixing legs 15 to cargo carrier 10.

Figure 4:
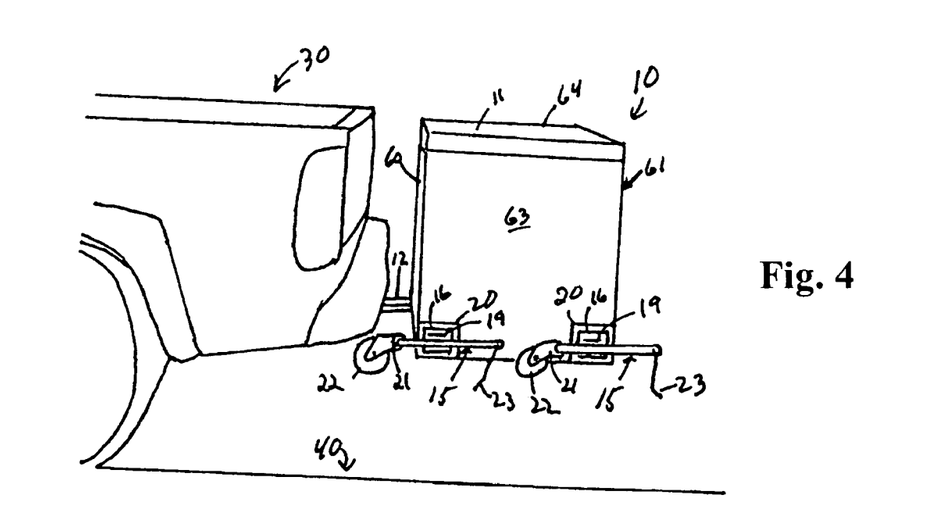
FIG. 4 shows the cargo carrier pushed towards the vehicle and the legs rotated upwards so that the cargo carrier can be transported by the vehicle.

FIG. 4 shows cargo carrier 10 pushed towards vehicle 30. The lower portions 43 of legs 15 have been withdrawn into upper portions 42 of legs 15, and legs 15 have been rotated upward off the ground 40. Cargo carrier 10 can now be safely transported by vehicle 30. Cargo carrier 10 can be removed from vehicle 10 by rotating the legs 15 toward the ground and operating the jack 44 to lower the lower leg portions 43 to the ground 40 so that wheels 22 touch ground 40. Bolts 33 can be removed from holes 24, 32, and 41, and cargo carrier 10 can be pulled away from vehicle 30 so that hitch sleeve 13 comes off of hitch shaft 12. Hitch shaft 12 can be removed from trailer hitch 31 and placed into hitch shaft holders 14. Cargo carrier 10 can then be moved on its wheels 22 to any desired location.

Figure 5:
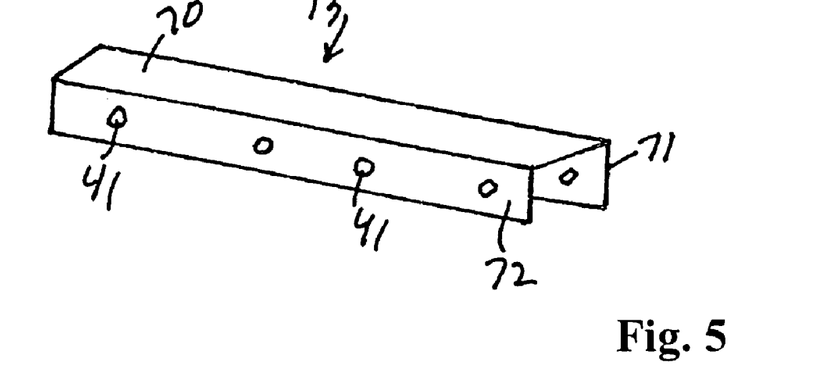
FIG. 5 shows a perspective view of the U-shaped hitch sleeve which is attached on the bottom of the cargo carrier.

FIG. 5 illustrates the features of U-shaped hitch sleeve 13. Hitch sleeve 13 has a top 70, a right side 71, a left side 72 and holes 41. Hitch sleeve 13 is constructed to fit over hitch shaft 12 so that holes 41 align with holes 24 in hitch shaft 12. Top 70 of hitch sleeve 13 is attached to bottom 65 of carrier 10, preferably in the center of bottom 65.

Figure 6:
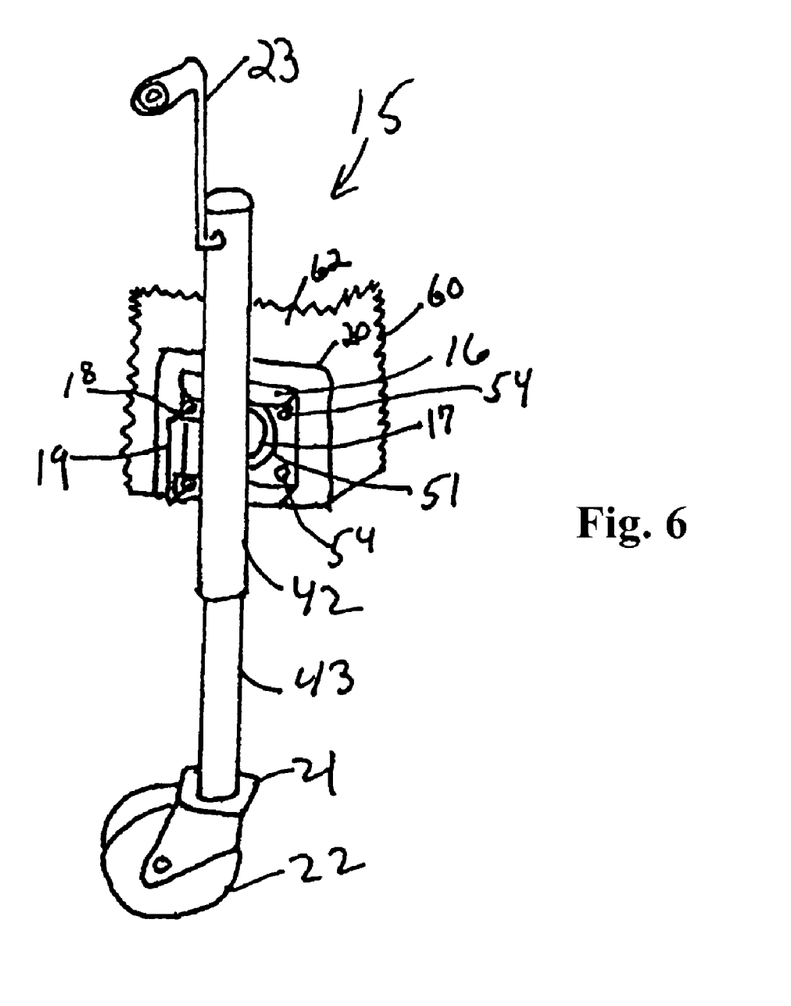
FIG. 6 shows the features of the cargo carrier legs in more detail.

FIG. 6 shows the features of leg 15 in more detail. Sleeve base 20 is fixed to cargo carrier 10. Sleeve base 20 has a sleeve 17 extending outward from base 20. Clamp frame 16 fits rotatably over sleeve 17. Clamp frame 16 is fixed to leg 15 so that leg 15 is thereby fixed rotatably to sleeve 17. Clamp frame 16 has a locking pin mechanism whereby locking pins 18 fit into locking pin holes 54 in sleeve base 20, thereby keeping legs 15 in a locked position. Pulling outward on locking pin handle 19 withdraws the locking pins 18 from locking pin holes 54, and legs 15 can then be rotated to any desired position.

Figure 7:
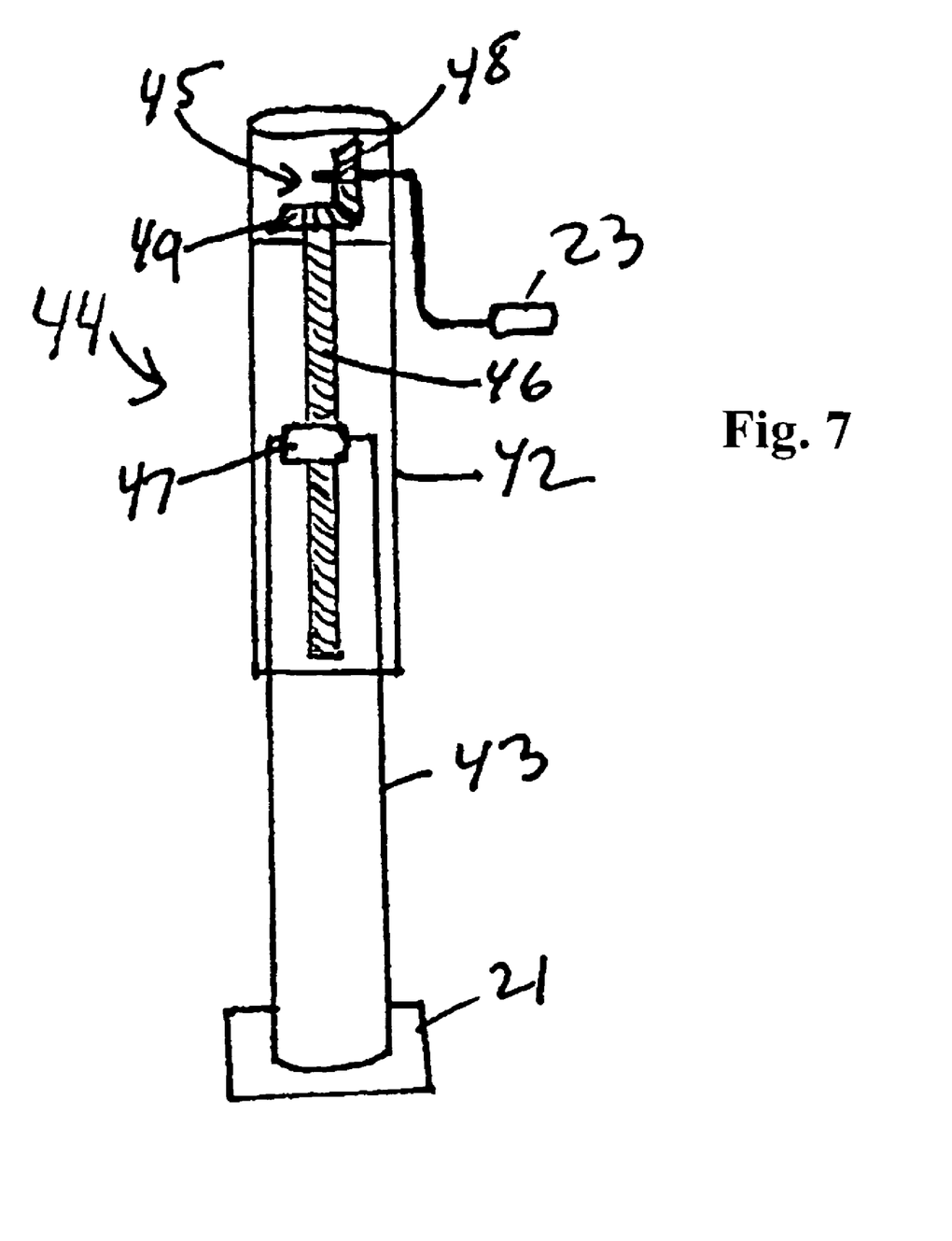
FIG. 7 shows the features of the screw type jack inside the cargo carrier legs in more detail.

FIG. 7 shows the features of screw type jack 44 in more detail. Upper portion 42 of leg 15 has a handle 23 inserted into upper portion 42. The part of handle 23 inside upper portion 42 has a gear 48 which engages a gear 49, forming a worm gear 45. Gear 49 is attached to one end of a threaded screw shaft 46. The opposite end of the threaded screw shaft 46 engages a threaded nut 47 at the top of lower leg portion 43.

As handle 23 is rotated the worm gear 45 causes the screw shaft 46 to rotate, screwing the screw shaft 46 into or out of threaded nut 47, depending on which direction the handle 23 is rotated. As screw shaft 46 is screwed into threaded nut 47, lower leg portion 43 is withdrawn into upper leg portion 42. As screw shaft 46 is screwed out of threaded nut 47, lower leg portion 43 is extended out of upper leg portion 42. This screw type jack 44 allows several hundred pounds to be easily raised or lowered in cargo carrier 10. These kinds of screw type jacks are known and can be purchased from Harbor Freight Tools, Birmingham, Ala.

Figure 8:
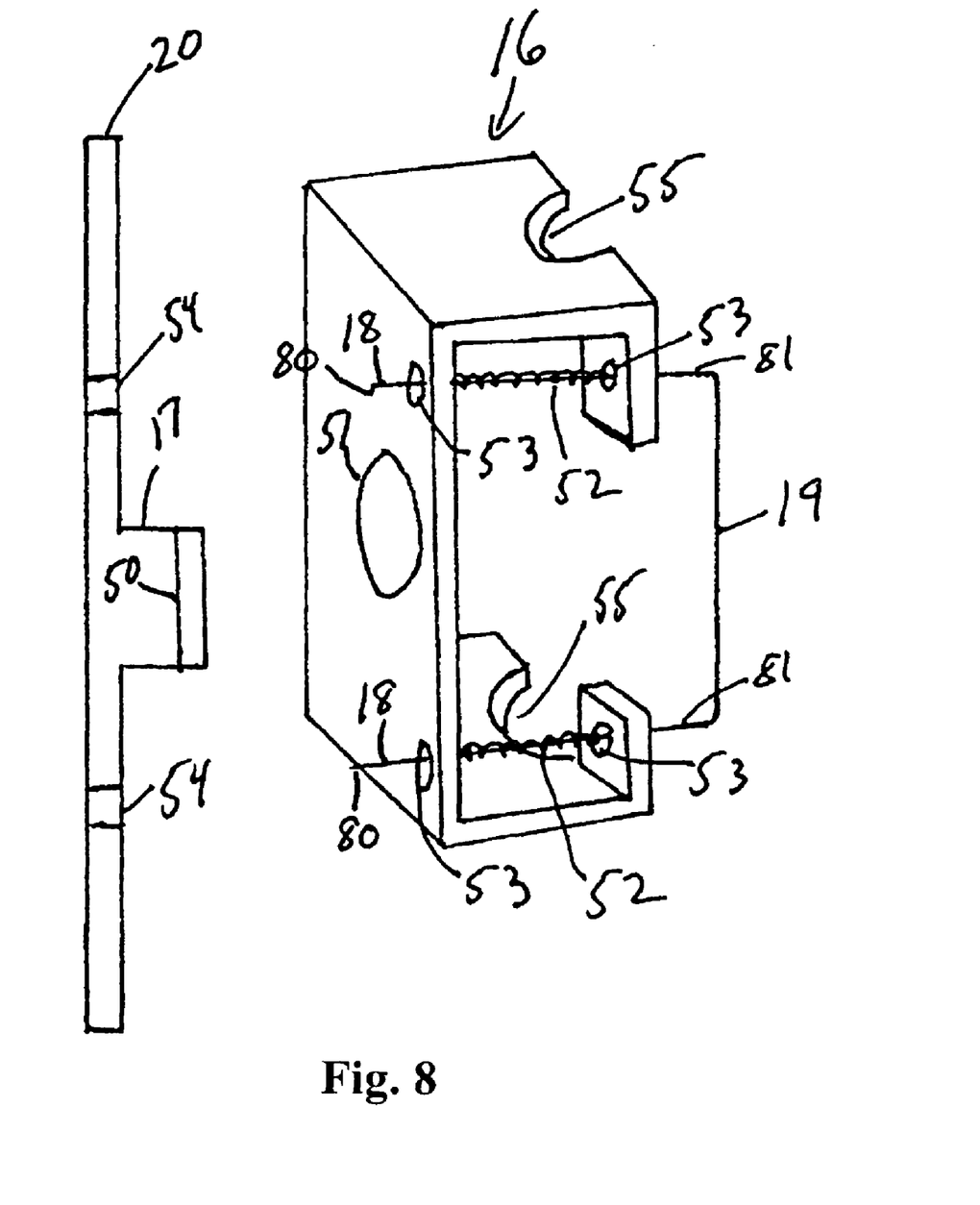
FIG. 8 shows the cargo carrier sleeve base and leg clamp frame in more detail.

FIG. 8 shows the features of clamp frame 16 and sleeve base 20 in more detail. Sleeve base 20 is fixed to cargo carrier 10, preferably on the sides 62 and 63 near bottom 65. Sleeve base 20 has a sleeve 17 which extends outward. Sleeve 17 has a snap ring groove 50 to lock clamp frame 16 rotatably onto sleeve 17 by means of a snap ring (not shown). Sleeve base 20 has a plurality of locking pin holes 54 for receiving locking pins 18 to lock clamp frame 16 in position.

Clamp frame 16 has contours 55 constructed to fit around upper leg portion 42 so that clamp frame 16 can be welded to upper leg portion 42. Clamp frame 16 also has a hole 51 constructed to fit over sleeve 17 so that clamp frame 16 can rotate around sleeve 17. Clamp frame 16 has holes 53 to accommodate locking pins 18. Locking pins 18 have first ends 80 which fit into locking pin holes 54. Locking pins 18 have opposite ends 81 which are continuous to form locking pin handle 19. Locking pins 18 have springs 52 which bias locking pins 18 into locking pin holes 54 on sleeve base 20. Locking pins 18 can be removed from locking pin holes 54 by pulling on locking pin handle 19. Thus, by pulling on locking pin handle 19, legs 15 can be rotated to any desired position. When locking pins 18 are aligned with any given pair of locking pin holes 54, legs 15 can be locked into a desired position by releasing locking pin handle 19. In this manner, legs 15 can be rotated upward towards the cargo carrier 10 or downward towards the ground 40.

Figure 9:
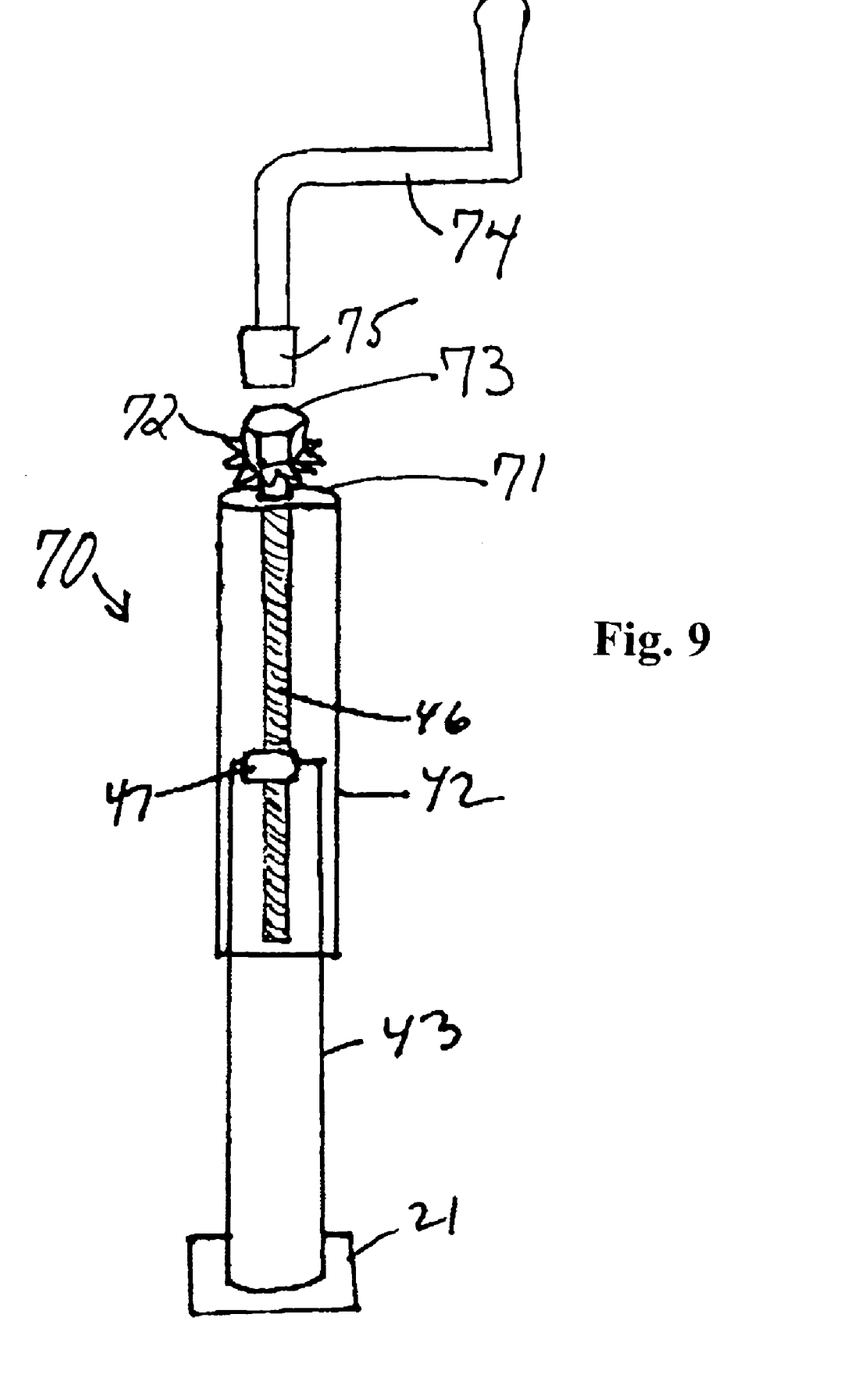
FIG. 9 shows a screw type jack of the cargo carrier leg for use inside the cargo carrier.

FIG. 9 shows an alternative embodiment of the legs 15 providing a screw type jack 70 for adaptation of legs 15 inside of cargo carrier 10. The screw type jack 70 is similar to the one shown in FIG. 7 except that there is no worm gear arrangement 45 or handle 23. Instead, the top end of screw shaft 46 extends up through the top end 71 of upper portion 42. The portion of screw shaft 46 that protrudes out through the top end 71 has a nut 73 attached to it. This nut 73 can engage a socket 75 on a handle 74 so that handle 74 can rotate screw shaft 46 to raise or lower the lower portion 43 of screw type jack 70. The screw shaft 46 can also have a chain sprocket 72 adjacent the nut 73 to engage a chain.

Figure 10:
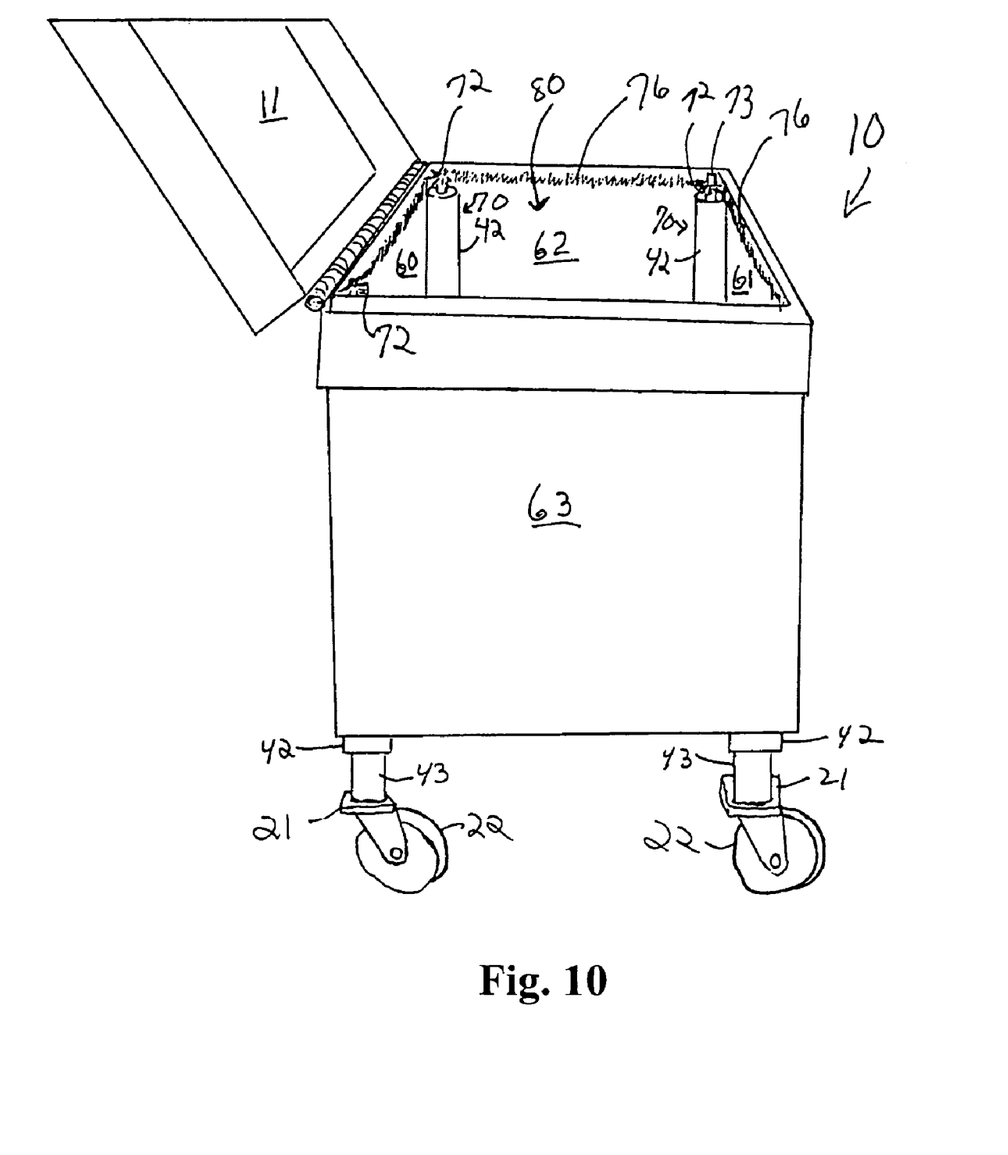
FIG. 10 presents a right, top perspective view of the inside of the cargo carrier showing the placement of the screw type jack legs and a chain drive that operates all the jacks simultaneously.
Figure 11:
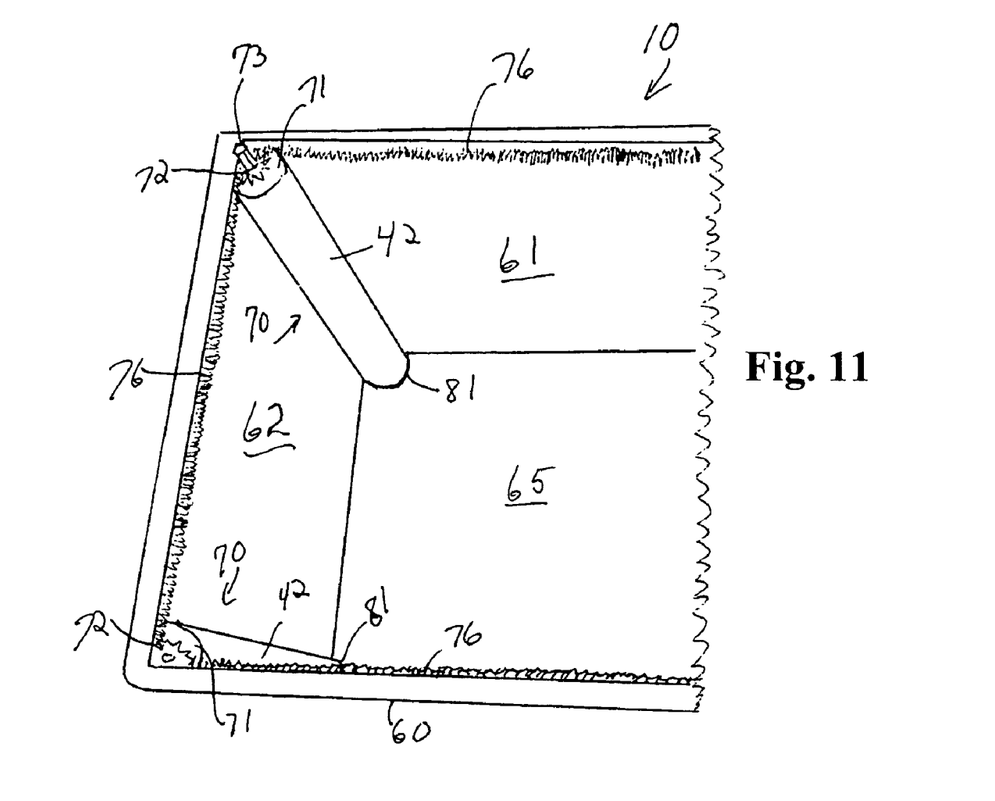
FIG. 11 presents a front, top perspective view of the inside of the cargo carrier.
Figure 12:
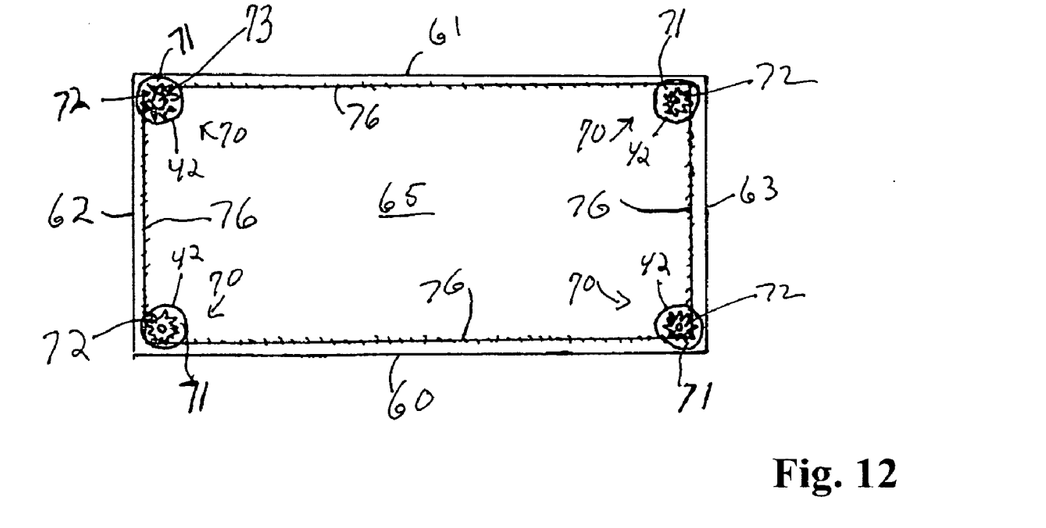
FIG. 12 presents a top plan view of the inside of the cargo carrier.

FIGS. 10, 11, and 12 show various views of the legs 15 having screw type jacks 70 positioned within the inside 80 of cargo carrier 10. The upper portions 42 of four screw type jacks 70 are positioned at the inside corners of cargo carrier 10. These upper portions 42 interface with or pass through openings 81 in the bottom 65 of cargo carrier 10 so that the lower portions 43 can pass through the bottom 65. All four screw type jacks 70 can have a nut 73 to adjust the position of the lower portions 43 individually. On the other hand, only one screw type jack 70 need have a nut 73 when placing a continuous loop chain 76 around the sprockets 72 of each of the screw type jacks 70. With the continuous loop chain 76 in place, as the single nut 73 is rotated with handle 74 and socket 72, the chain 76 will drive all four screw shafts 46 simultaneously, thereby raising or lowering the cargo carrier 10. A motor driven socket may also be used.

The foregoing description has been limited to specific embodiments of this invention. It will be apparent, however, that variations and modifications may be made by those skilled in the art to the disclosed embodiments of the invention, with the attainment of some or all of its advantages and without departing from the spirit and scope of the present invention. For example, legs 15 can be mounted inside cargo carrier 10 so that jack handle 23 extends through the side of cargo carrier 10. Legs 15 can be mounted on the front 60 and back 61 of carrier 10. The components of the present invention can be made of metal, plastic, or a combination thereof. A single handle 23 can be constructed to operate all the jack mechanisms simultaneously by connecting all the gears 48 with shafts.

It will be understood that various changes in the details, materials, and arrangements of the parts which have been described and illustrated above in order to explain the nature of this invention may be made by those skilled in the art without departing from the principle and scope of the invention as recited in the following claims.

What is claimed is:

1. A cargo carrier, comprising:
    a) a top having a lid, sides having legs, and a bottom having a U-shaped hitch sleeve;
    b) a hitch shaft being reversibly connectable to a trailer hitch on a vehicle;
    c) said legs having wheels so that said U-shaped hitch sleeve is alignable to be positioned above and fit over said hitch shaft, and so that said cargo carrier is portable when not connected to said vehicle;
    d) said legs having a jack mechanism to lower said cargo carrier to place said U-shaped hitch sleeve around said hitch shaft, and to raise said legs so that said vehicle can transport said cargo carrier on said hitch shaft;
    e) said U-shaped hitch sleeve being reversibly connectable to said hitch shaft by one or more bolts inserted horizontally through said U-shaped hitch sleeve and said hitch shaft; and
    f) said legs positioned inside said cargo carrier, said legs having an upper portion and a lower portion whereby said lower portion of said leg is able to pass through said bottom of said cargo carrier.

2. The cargo carrier of claim 1 wherein said jack mechanism lengthens said leg by extending said lower portion of said leg out of said upper portion of said leg, and shortens said leg by withdrawing said lower portion of said leg into said upper portion of said leg.

3. The cargo carrier of claim 2 wherein said jack mechanism consists of a screw shaft inside each of said upper portions of said legs, said screw shaft having a top end and said upper portion having a top end, whereby said top end of said screw shaft extends up through said top end of said upper portion, said top end of said screw shaft having a nut to rotate said screw shaft to raise or lower said lower portion of said leg.

4. The cargo carrier of claim 3 wherein said top end of said screw shaft has a sprocket with a continuous loop chain placed around each sprocket of all screw shafts so that as a nut on one screw shaft is rotated all screw shafts of said legs are rotated simultaneously to raise or lower said cargo carrier.

* * * * *